United States Patent
Nagai (10) Patent No.: US 7,381,481 B2
(45) Date of Patent: Jun. 3, 2008

(54) MAGNETIC TAPE HAVING CONTROLLED HEAT-SHRINKAGE AND HUMIDITY EXPANSION WITH TWO OR MORE COLUMN-LIKE MAGNETIC LAYERS

(75) Inventor: Nobuyuki Nagai, Miyagi (JP)

(73) Assignee: Sony Corporation, Tokyo (JP)

( * ) Notice: Subject to any disclaimer, the term of this patent is extended or adjusted under 35 U.S.C. 154(b) by 179 days.

(21) Appl. No.: 10/777,001

(22) Filed: Feb. 11, 2004

(65) Prior Publication Data
US 2004/0166375 A1    Aug. 26, 2004

(30) Foreign Application Priority Data
Feb. 20, 2003  (JP)  ............... P2003-042730

(51) Int. Cl.
*G11B 5/66*       (2006.01)
*G11B 5/716*      (2006.01)

(52) U.S. Cl. ............... 428/830; 428/839.2; 428/842

(58) Field of Classification Search ............... None
See application file for complete search history.

(56) References Cited

U.S. PATENT DOCUMENTS

| | | | | |
|---|---|---|---|---|
| 4,743,487 A | * | 5/1988 | Saito et al. | 428/141 |
| 4,770,924 A | * | 9/1988 | Takai et al. | 428/212 |
| 4,781,964 A | * | 11/1988 | Mizuno et al. | 428/141 |
| 5,453,886 A | * | 9/1995 | Kobayashi et al. | 360/46 |
| 5,558,945 A | * | 9/1996 | Miyazaki et al. | 428/611 |
| 5,691,008 A | * | 11/1997 | Thoma et al. | 427/531 |
| 5,731,068 A | * | 3/1998 | Mizunoya et al. | 428/212 |
| 2002/0018918 A1 | * | 2/2002 | Saito et al. | 428/694 TR |
| 2002/0119344 A1 | * | 8/2002 | Takahashi et al. | 428/694 BB |
| 2003/0054202 A1 | * | 3/2003 | Arisaka et al. | 428/694 BA |
| 2003/0152812 A1 | * | 8/2003 | Fujiki | 428/695 |
| 2004/0021024 A1 | * | 2/2004 | Yoshimura et al. | 242/348 |

(Continued)

FOREIGN PATENT DOCUMENTS

JP      57-018025 A  *  1/1982

(Continued)

OTHER PUBLICATIONS

JPO Abstract Translation of JP 2002-025033.*

(Continued)

*Primary Examiner*—Kevin M Bernatz
(74) *Attorney, Agent, or Firm*—Sonnenschein Nath & Rosenthal LLP (57) ABSTRACT

A magnetic tape having a small degree of deformation, high form stability and little decrease in reproduction output even after stock at a high humidity is provided. The magnetic tape includes a longitudinally extending nonmagnetic support, a magnetic layer formed by depositing a plurality of evaporated magnetic films, each having an oblique column-like structure, on a principal surface of the nonmagnetic support so that a growth direction of each of the evaporated magnetic films is opposite to the longitudinal direction, a protective layer formed on the magnetic layer, and a backcoating layer formed on the other surface of the nonmagnetic support, wherein a heat-shrinkage ratio in the longitudinal direction and a width direction is defined to be 0.50% or less and a humidity expansion coefficient at 25° C. is defined to be $1 \times 10^{-6}/\%$ RH or less after stock at 100° C. and 5% RH for 30 minutes.

3 Claims, 3 Drawing Sheets

U.S. PATENT DOCUMENTS

2004/0126622 A1* 7/2004 Motohashi .............. 428/694 B
2005/0266273 A1* 12/2005 Motohashi ................. 428/827

FOREIGN PATENT DOCUMENTS

JP            05-212787 A  *  8/1993

OTHER PUBLICATIONS

JPO Abstract Translation of JP 57-018025-A (Pat-No JP357018025 A) (Jan. 29, 1982).*
Derwent Abstract Translation of JP 05-212787 A (Derwent-Acc-No. 1993-299299).*

* cited by examiner

| | MAGNETIC LAYER (nm) | PROTECTION LAYER (nm) | BASE (μm) | TOTAL TAPE (μm) | BASE | TOTAL TAPE/MAGNETIC LAYER | HEAT SHRINKAGE (%) | HUMIDITY EXPANSION ×10-6/%RH | OUTPUT DIFFERENCE (dB) | STOCK STABILITY |
|---|---|---|---|---|---|---|---|---|---|---|
| EXAMPLE1 (SINGLE LAYER) | 50 | 10 | 8 | 8.56 | PET | 171.2 | 0.2 | 0.4 | 0.5 | ○ |
| EXAMPLE2 | 25 | 10 | 8 | 8.54 | PET | 341.6 | 0.25 | 0.5 | 0 | ○ |
| EXAMPLE3 | 75 | 10 | 8 | 8.58 | PET | 114.4 | 0.1 | 0.3 | 1 | ○ |
| EXAMPLE4 | 50 | 10 | 6 | 6.56 | PET | 131.2 | 0.2 | 0.4 | 0.5 | ○ |
| EXAMPLE5 | 50 | 10 | 8 | 8.56 | PEN | 171.2 | 0.1 | 0.4 | 0.5 | ○ |
| EXAMPLE6 | 50 | 10 | 8 | 8.56 | ARAMID | 171.2 | 0 | 0.3 | 0.5 | ○ |
| EXAMPLE7 | 10 | 10 | 8 | 8.56 | PET | 856.0 | 0.5 | 1 | 0 | ○ |
| EXAMPLE8 | 15 | 10 | 8 | 8.56 | PET | 570.7 | 0.35 | 0.7 | 0 | ○ |
| EXAMPLE9 | 50 | 10 | 4 | 4.56 | PET | 91.2 | 0.1 | 0.3 | 0.5 | ○ |
| EXAMPLE10 | 50 | 10 | 9 | 9.56 | PET | 956.0 | 0.2 | 0.4 | 0.5 | ○ |
| COMPARATIVE EXAMPLE1 | 50 | 0 | 8 | 8.56 | PET | 171.2 | 0.7 | 5 | 0.5 | × |
| COMPARATIVE EXAMPLE2 | 7.5 | 10 | 8 | 8.51 | PET | 1134.7 | 0.7 | 4 | 0 | × |
| COMPARATIVE EXAMPLE3 | 150 | 10 | 8 | 8.66 | PET | 57.7 | 0.2 | 0.3 | 3 | ○ |
| COMPARATIVE EXAMPLE4 | 50 | 10 | 3 | 3.56 | PET | 71.2 | 0.2 | 0.4 | 0.5 | NOT RUN |
| COMPARATIVE EXAMPLE5 | 50 | 10 | 15 | 15.56 | PET | 311.2 | 0.7 | 3 | 0.5 | × |
| COMPARATIVE EXAMPLE6 | 50 (SINGLE LAYER) | 10 | 8 | 8.56 | PET | 171.2 | 0.2 | 0.4 | 3 | ○ |
| COMPARATIVE EXAMPLE7 | 10 | 10 | 10 | 10.56 | PET | 1056.0 | 0.6 | 2 | 0 | ○ |
| COMPARATIVE EXAMPLE8 | 8.5 | 10 | 8 | 8.51 | PET | 1001.2 | 0.6 | 3 | 0 | × |
| COMPARATIVE EXAMPLE9 | 50 | 10 | 2 | 2.56 | PET | 51.2 | 0.1 | 0.2 | 0 | NOT RUN |
| COMPARATIVE EXAMPLE10 | 50 | 10 | 12 | 12.56 | PET | 251.2 | 0.6 | 2.5 | 0.5 | × |

MAGNETIC TAPE HAVING CONTROLLED HEAT-SHRINKAGE AND HUMIDITY EXPANSION WITH TWO OR MORE COLUMN-LIKE MAGNETIC LAYERS

CROSS REFERENCE TO RELATED APPLICATION

This application claims priority from Japanese Priority Document No. 2003-042730, filed on Feb. 20, 2003 with the Japanese Patent Office, which document is hereby incorporated by reference.

BACKGROUND OF THE INVENTION

1. Field of the Invention

The present invention relates to a magnetic tape, in particular, to a magnetic tape used as an external recording medium for recording data, which includes a magnetic layer composed of evaporated magnetic films.

2. Description of the Related Art

Recently, along with the diffusion of minicomputers, personal computers or office computers such as work stations, a magnetic tape for recording computer data as an external recording medium (a so-called backup tape) has been actively studied.

For practical use of such a magnetic tape for data storage, the increase in storage capacity is highly demanded in relation with, in particular, the miniaturization of computers and the increase in information processability. In addition, with the expansion of the environment where computers are used, the magnetic tape is now used under a broad range of environmental conditions (in particular, under the conditions where a humidity and a temperature greatly fluctuate).

Therefore, the magnetic tape is more and more strongly required to have high tape running durability and the capability of stably recording data after repeated use at high speed, reliability in view of performance such as readout performance, reliability in stable reproduction even after stock for a long period of time and the like, even in such an expanding environment.

Conventionally, as a magnetic tape used for data storage, a coating-type magnetic tape is now widely used. This type of magnetic tape is fabricated by applying and drying a magnetic coating material, which is obtained by dispersing a powered magnetic material in an organic binder, onto a nonmagnetic support. In order to ensure long-term reliability of the coating-type magnetic tape, various conditions are defined for the magnetic tape (see JP 11-96545 A).

On the other hand, with an increasing demand for high-density magnetic recording mentioned above, a metal magnetic thin-film type magnetic tape, a so-called metal-evaporated tape, has been proposed and attracted attention. In this type of magnetic tape, a metal magnetic material is directly deposited onto a nonmagnetic support by plating or vacuum thin-film formation means.

Two types of recording/reproduction system for a magnetic tape used for data storage have been put into practical use, namely a helical scan system and a linear system. For the data storage applications where a volume is not strictly limited, the linear system is now practically used. Moreover, in the commercial market, products such as a digital linear tape (DLT) or a linear tape-open (LTO) become predominant.

The linear system is for providing tracks in a width direction of a magnetic tape so as to bidirectionally record-ing and reproducing data in a longitudinal direction. This system is advantageous in facility of allowing a magnetic tape to run at high speed and in capability of improving a transfer rate of recording and reproduction by arranging a plurality of magnetic heads in parallel.

As a magnetic tape used for data storage in the linear system, not an obliquely evaporated magnetic tape but only the coating-type magnetic tape has been used. The reason for this is as follows. Since a magnetic tape bidirectionally runs in the linear system, characteristics such as the optimum recording current, a phase characteristic, a C/N ratio and an output characteristic greatly differ between a forward longitudinal direction and a reverse longitudinal direction of the tape in recording and reproduction.

As a method for solving such a problem, an obliquely evaporated tape including a magnetic layer composed of two obliquely evaporated films, each having a different growth direction of oblique evaporation, has been proposed (see JP 4-353622 A and JP 10-198940 A). In this context, the obliquely evaporated magnetic tape starts attracting lots of attention again as a magnetic tape medium for data storage used in the linear system.

As mentioned above, along with rapid diffusion of personal computers and the like, the magnetic tape for recording computer data is now frequently used under the environments where a temperature and a humidity greatly fluctuate. Therefore, in the case where the obliquely evaporated magnetic tape is used, it is desired that the recording and reproducing operation do not produce any errors and have high reliability in terms of stable data input/output even when the magnetic tape is used under severe environmental conditions as mentioned above.

In particular, since a total thickness tends to be reduced so as to achieve large recording capacity, a tape itself is required to have higher rigidity and wear resistance than ever before. In addition, the magnetic tape is required to have a lower degree of deformation with respect to a change in temperature and humidity and therefore have excellent form (dimensional) stability.

Moreover, in order to achieve a higher recording density, a system enabling the data recording and reproduction in a narrower track width than a conventional one is now under development. Therefore, a metal-evaporated tape having high form stability, which is sufficiently compatible with such a magnetic recording/reproduction system, is required.

As a result of the studies made by the inventor of the present invention, however, it is found that the metal-evaporated tape is not still satisfactory in terms of form stability in the case where it is used as a conventional magnetic tape for computer data recording. For example, generally, a magnetic tape is likely to be extended in a longitudinal direction in its fabrication step while it is likely to gradually shrink during stock after the fabrication. Even in the case where the metal-evaporated tape is used for conventional computer data recording, a shrinkage ratio is relatively large. Therefore, if recording/reproduction is performed on/from this tape, it is found that tracking accuracy is lowered. Because of the thus lowered tracking accuracy, a reproduction output is likely to be lowered.

In the case where a fabricated metal-evaporated tape is stocked at a high humidity, it is found out that the tape absorbs moisture to be easily deformed. As a result, a reproduction output is also likely to be lowered as described above.

SUMMARY OF THE INVENTION

The present invention is devised in view of the above problem and provides a magnetic tape having a low degree of tape form (dimensional) deformation even after stock at a high humidity to offer high form stability and little decrease in reproduction output. Another object of the present invention is to provide a magnetic tape for computer data recording, which is optimized for a magnetic recording/reproduction system enabling high-density recording.

In order to achieve the above objects, the magnetic tape according to the present invention includes, a longitudinally extending nonmagnetic support, a magnetic layer formed by depositing a plurality of evaporated magnetic films, each having an oblique column-like structure, on a principal surface of the nonmagnetic support so that a growth direction of each of the deposited evaporated magnetic films is opposite to the longitudinal direction, a protective layer formed on the magnetic layer, and a backcoating layer formed on the other surface of the nonmagnetic support, wherein a heat-shrinkage ratio in the longitudinal direction and a width direction is defined to be 0.50% or less and a humidity expansion coefficient is defined to be $1 \times 10^{-6}$/% RH or less after stock at 100° C. and 5% RH for 30 minutes. Throughout the specification, a humidity expansion coefficient (hygroscopic expansion coefficient) signifies a humidity expansion coefficient at a temperature of 25° C.

According to one aspect of the magnetic tape of the present invention, by fabricating the magnetic tape so that the heat-shrinkage factor and the humidity expansion coefficient satisfy the above conditions, the magnetic tape, which has little form deformation even after long-term stock or in use at a high humidity and therefore has little decrease in reproduction output, can be obtained. Such a magnetic tape is suitably used for, for example, computer data recording.

According to the present invention, the magnetic tape is fabricated so that the heat-shrinkage ratio in the longitudinal direction and the width direction is 0.50% or less and the humidity expansion factor is $1 \times 10^{-6}$/% RH or less after stock at 100° C. and 5% RH for 30 minutes. As a result, the magnetic tape having little form deformation even after long-term stock or in use at a high humidity and therefore having little decrease in reproduction output, can be obtained.

DESCRIPTION OF THE PREFERRED EMBODIMENTS

Hereinafter, the preferred embodiment of a magnetic tape of the present invention will be described with reference to the accompanying drawings.

Figure 1:
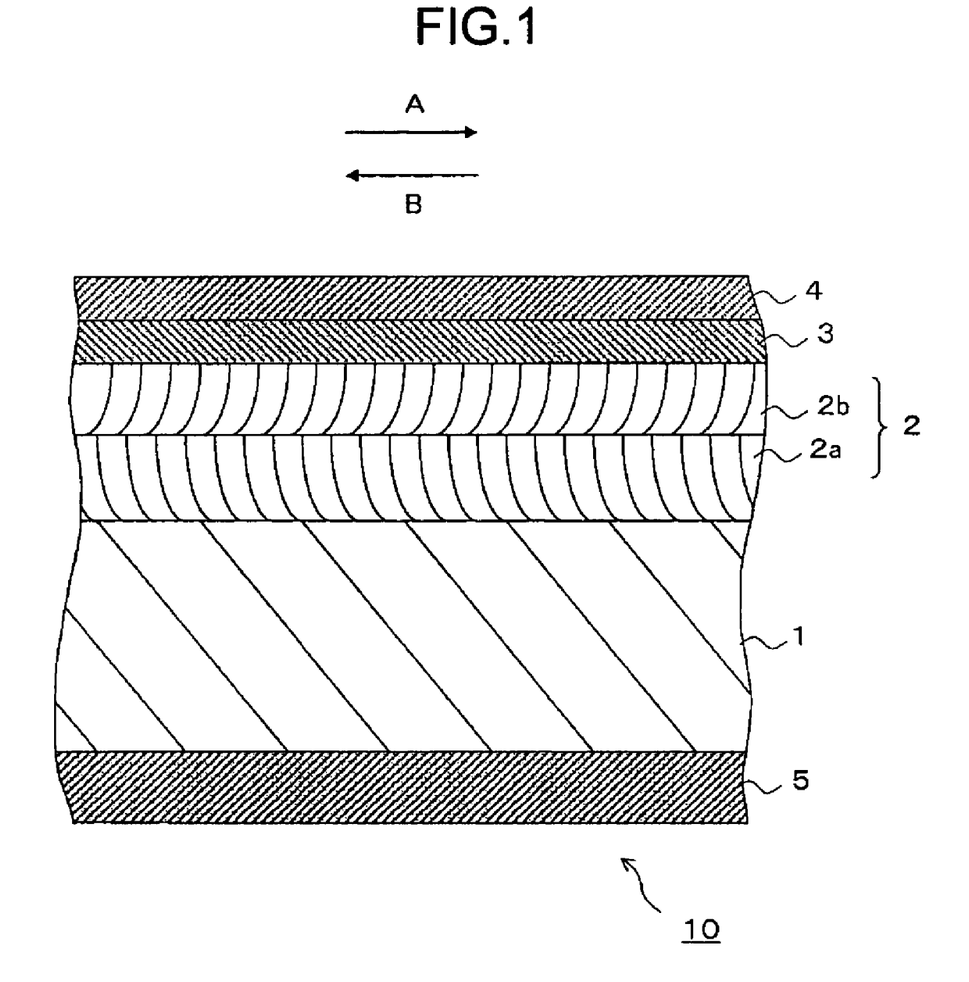
FIG. 1 is a schematic configuration view showing an example of a magnetic tape according to an embodiment of the present invention.

FIG. 1 is a schematic configuration view showing an example of a magnetic tape according to an embodiment of the present invention. As shown in FIG. 1, a magnetic tape 10 according to this embodiment includes a nonmagnetic support (base film) 1, a plurality of metal magnetic thin films serving as a magnetic layer 2 formed on a principal surface of the nonmagnetic support 1, which are made of a ferromagnetic metal material, a protective film 3 formed on the magnetic layer 2, and a lubricant layer 4 formed on the protective film 3 as the uppermost layer. Among them, the magnetic layer 2 has a double-layered structure composed of a lower-layer magnetic thin film 2a and an upper-layer magnetic thin film 2b. On the other surface of the nonmagnetic support 1, which is opposite to the surface where the magnetic layer 2 is formed, a backcoating layer 5 is formed.

As the nonmagnetic support 1, for example, polyesters such as polyethylene terephthalate (PET) and polyethylene naphthalate (PEN), polyolefins such as polyethylene and polypropylene, cellulose derivatives such as cellulose triacetate and cellulose diacetate, vinyl resins such as a polyvinyl chloride and polyvinylidene chloride, plastics such as polycarbonate, polyimide, polyamide and polyamide imide can be used.

The above-mentioned nonmagnetic support 1 is made of a resin, and therefore is likely to thermally shrink and hygroscopically expand in any cases. Accordingly, in this embodiment, a thickness of the hard magnetic layer 2 or the protective film 3 formed on the nonmagnetic support 1 serving as a base and the like is appropriately set so as to define a heat-shrinkage ratio in a longitudinal direction and a width direction of the tape to be 0.50% or less and a humidity expansion coefficient to be $1 \times 10^{-6}$/% RH or less after stock at 100° C. and 5% RH for 30 minutes as the entire magnetic tape.

It is preferred that a thickness of the nonmagnetic support 1 is within the range of 4 μm to 10 μm. If the thickness of the nonmagnetic support 1 is too small, the magnetic tape is prevented from stably running. If too large, the reinforcement by the magnetic layer 2 or the protective layer 3 is not sufficient, resulting in a large heat-shrinkage ratio or humidity expansion coefficient. As a result, the recording tape stock characteristics are degraded.

The magnetic layer 2 has a double-layered structure of the lower-layer magnetic thin film 2a and the upper-layer magnetic thin film 2b which are formed by directly depositing a ferromagnetic metal material onto the nonmagnetic support 1. As the ferromagnetic metal thin films 2a and 2b serving as the magnetic layer 2, for example, besides metals such as Fe, Co and Ni, alloys such as a Co—Ni alloy, a Co—Pt alloy, a Co—Ni—Pt alloy, an Fe—Co alloy, an Fe—Ni alloy, an Fe—Co—Ni alloy, an Fe—Co—B alloy, a Co—Ni—Fe—B alloy, an Co—Cr alloy, or a ferromagnetic metal material containing a metal such as Cr or Al in any one of the above-cited alloys can be used. For use in the linear system, it is desirable that the magnetic layer 2 has a multilayered structure including two or more layers. FIG. 1 shows the magnetic layer 2 having a double-layered structure as an example.

It is preferred that a total thickness of the plurality of magnetic thin films 2a and 2b is set at 10 nm to 75 nm in the case where the nonmagnetic support 1 has the above-described thickness. Furthermore, it is preferred that a ratio of the total thickness of the tape to the thickness of the magnetic layer 2 is set at 1000 or less.

The reason for regulating the thickness of the magnetic layer 2 within the above-mentioned range is as follows. If the thickness of the magnetic layer 2 is too small, the reinforcement for the nonmagnetic support 1 is not sufficient, preventing the heat-shrinkage ratio or the humidity expansion coefficient of the entire tape from being kept within the above range. If too large, a difference in output between a forward direction (a direction A in FIG. 1) and the opposite direction (a direction B in FIG. 1) becomes large.

Furthermore, a ratio of the total thickness of the tape to the thickness of the magnetic layer is set at 1000 or less because the functions of the magnetic layer 2 of reinforcing the nonmagnetic support 1 is affected by a relative ratio of the thickness of the magnetic layer 2 and that of the nonmagnetic support 1. When the thickness of the magnetic layer 2 with respect to the entire tape is small, the heat-shrinkage ratio or the humidity expansion coefficient of the entire tape cannot be kept within the above range. The above description is made for the total thickness of the tape, because the thickness of the nonmagnetic support 1 most contributes to the total thickness of the tape and therefore can be approximately regarded as the total thickness herein without any problems.

The magnetic layer 2 is formed by, for example, vacuum evaporation for heating and evaporating a ferromagnetic metal material under a vacuum so as to deposit the evaporated material. According to the vacuum evaporation, a ferromagnetic metal material is evaporated by resistance heating, high-frequency heating, electron-beam heating or the like under a vacuum at $1 \times 10^{-2}$ Pa to $1 \times 10^{-6}$ Pa so as to deposit the evaporated metal (the ferromagnetic metal material) onto the nonmagnetic support 1. In order to obtain a large antimagnetic force, oblique evaporation for obliquely depositing the ferromagnetic metal material to the nonmagnetic support 1 is generally used. Furthermore, the oblique evaporation herein includes evaporation conducted in an oxygen atmosphere so as to obtain a larger antimagnetic force.

Figure 2:
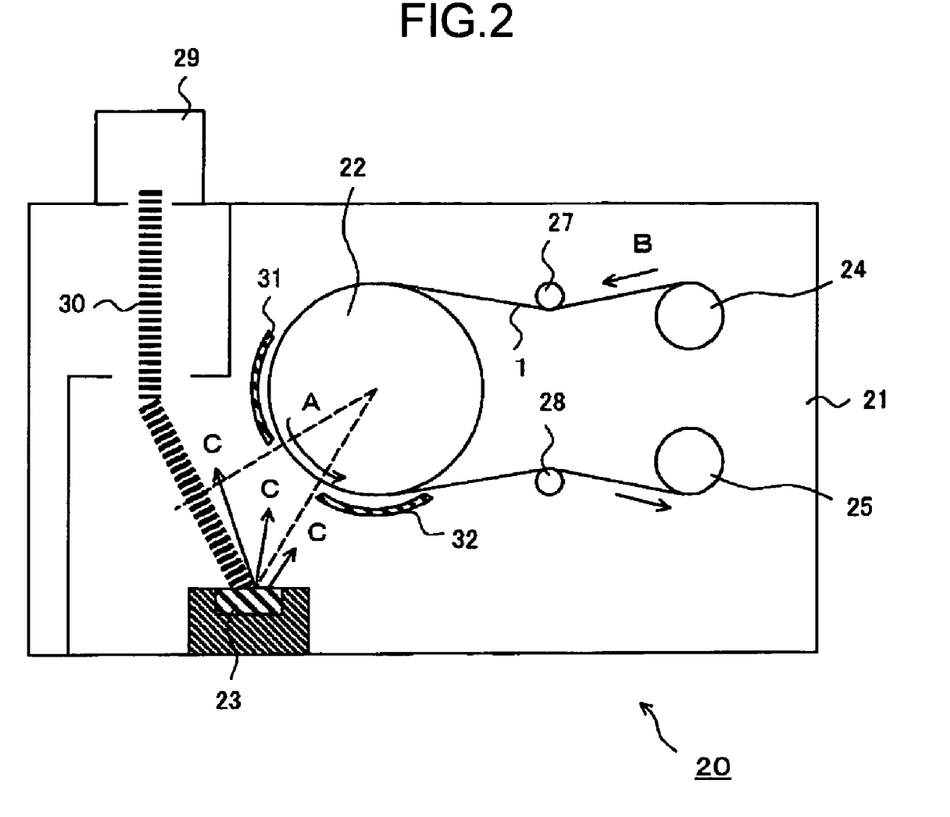
FIG. 2 is a diagram showing a configuration of a continuous roll type vacuum evaporation apparatus used as a vacuum evaporation apparatus for forming a magnetic layer.

FIG. 2 shows the configuration of a continuous roll type vacuum evaporation apparatus used as a vacuum evaporation apparatus for forming the magnetic layer 2. A vacuum evaporation apparatus 20 shown in FIG. 2 is constituted as a so-called vacuum evaporation apparatus for oblique evaporation. In a vacuum chamber 21 in a vacuum state at, for example, about $1 \times 10^{-6}$ Pa to $1 \times 10^{-6}$ Pa, a cooling can 22 and an evaporation source 23 for ferromagnetic metal thin films are provided. The cooling can 22 is cooled at, for example, about −20° C. and rotates in a direction indicated with an arrow A in FIG. 2. The evaporation source 23 is provided so as to be opposed to the cooling can 22.

In the vacuum evaporation apparatus 20, a supply roll 24 and a winding roll 25 are also provided in the vacuum chamber 21 shown in FIG. 2. After formation of the magnetic layer 2, the nonmagnetic support 1 is sent from the supply roll 24 in a direction indicated with an arrow B in FIG. 2 so as to run along the circumferential face of the cooling can 22. Thereafter, the nonmagnetic support 1 is wound up around the winding roll 25.

A guide roller 27 is provided between the supply roll 24 and the cooling can 22, whereas a guide roller 28 is provided between the cooling can 22 and the winding roll 25. The guide rollers 27 and 28 apply a predetermined tension to the nonmagnetic support 1 running along the supply roll 24 to the cooling can 22 and in turn to the winding roll 25 so that the nonmagnetic support 1 smoothly runs.

The evaporation source 23 is a ferromagnetic metal material such as Co put in a container such as a crucible. In the vacuum evaporation apparatus 20, an electron beam generator 29 for heating and evaporating the ferromagnetic metal material in the evaporation source 23 is also provided. An electron beam 30 generated from the electron beam generator 29 is accelerated and radiated to the ferromagnetic metal material of the evaporation source 23 to heat the ferromagnetic metal material of the evaporation source 23 so as to be evaporated as indicated with an arrow C in FIG. 2. The evaporated ferromagnetic metal material is deposited onto the nonmagnetic support 1 running along the circumferential face of the cooling can 22 opposed to the evaporation source 23, thereby forming a ferromagnetic metal thin film.

A first shutter 31 and a second shutter 32 are provided between the evaporation source 23 and the cooling can 22. The first shutter 31 is located on the former side of the running nonmagnetic support 1, whereas the second shutter 32 is located on the latter side of the nonmagnetic support 1. The first shutter 31 and the second shutter 32 allow only a predetermined area of the nonmagnetic support 1 running along the circumferential face of the cooling can 22 to be outwardly exposed.

For evaporation of the ferroelectric metal thin film, it is preferred to supply an oxygen gas to the vicinity of the surface of the nonmagnetic support 1 through an oxygen gas inlet port (not shown) so as to improve the magnetic characteristic, the durability and the weather resistance of the ferroelectric metal thin film. Moreover, besides the heating means using the electron beam as described above, for example, known means such as resistance heating means, high-frequency heating means and laser heating means can be used as means of heating the evaporation source 23.

In the vacuum evaporation apparatus 20 having the above-described structure, the ferromagnetic metal material is evaporated from the evaporation source 23 while the nonmagnetic support 1 is running along the circumferential face of the cooling can 22. The evaporated ferroelectric metal material is deposited only on the area which is externally exposed through a gap between the first shutter 31 and the second shutter 32.

Since the vacuum evaporation apparatus 20 makes the nonmagnetic support 1 run from the first shutter 31 toward the second shutter 32, the evaporated ferroelectric metal material is first deposited on the nonmagnetic support 1 on the first shutter 31 side. Then, as the nonmagnetic support 1 runs from the first shutter 31 toward the second shutter 32, the evaporated ferromagnetic metal material is sequentially deposited. Therefore, the magnetic layer, which is formed while limiting an incident angle of magnetic fine particles by the above-described film growth method, is characterized in having an oblique structure.

The magnetic layer 2 of the obliquely evaporated tape suitable for the linear system magnetic recording tape system using a highly-sensitive MR head in this embodiment has a structure in which the inclination of the oblique column-like structure of the lower-layer magnetic thin film 2a is opposite to that of the upper-layer magnetic thin film 2b.

In order to obtain the above-described structure of the magnetic layer 2, the oblique evaporation is carried out while the roll type nonmagnetic support 1 is running in one direction. After the growth of the lower-layer magnetic thin film 2a, the nonmagnetic support 1 is wound up in a roll form. After the wound roll is replaced by the supply roll 24, the oblique evaporation is carried out again as shown in FIG. 2. As a result, the magnetic layer 2 having a double-layered structure, each layer having an oblique structure of different inclination, can be obtained.

The protective layer 3 is made of carbon and formed on the magnetic layer 2. The protective layer 3 made of diamond-like carbon having a relatively high hardness is preferably exemplified. Owing to its high hardness, the protective film 3 serves to reinforce the nonmagnetic support 1 together with the magnetic layer 2 and to keep the heat-shrinkage ratio and the humidity expansion coefficient of the entire tape within the above-described range.

The protective film 3 is made by CVD (Chemical Vapor Deposition) or the like. In the case where the protective film 3 is formed by CVD, for example, a hydrocarbon gas or a mixture gas of hydrocarbon and an inert gas is introduced to the vacuum container. While a pressure is being kept at about 10 Pa to 100 Pa, discharge is generated in the vacuum container to generate a plasma of the hydrocarbon gas, thereby forming the protective layer 3 on the magnetic layer 2.

As a discharge form, any of an external electrode system and an internal electrode system can be used. A discharge frequency can be experimentally determined. By applying a voltage of 0 to −3 kV to an electrode provided on the side of the nonmagnetic support 1 where the magnetic layer 2 is formed, the hardness and the adhesiveness of the protective film 3 can be increased.

As the hydrocarbon serving as a material of the protective film 3, for example, methane, ethane, propane, butane, pentane, hexane, heptane, octane, ethylene, acetylene, propene, butene, pentene, benzene and the like can be used.

The lubricant layer 4 is provided so as to offer good running performance for the tape. The lubricant layer 4 is made of, for example, perfluoro carboxylic acid, perfluoro alkyl sulfonic acid, perfluoro polyether and the like by a solution application method, a vacuum evaporation method and the like.

The backcoating layer 5 is provided so as to offer good running performance for the tape. The backcoating layer 5 is provided on the principal face of the nonmagnetic support 1 opposite to the face where the magnetic layer 2 is grown. The backcoating layer 5 is formed by applying a coating material for backcoating, which is principally obtained by mixing and dispersing an inorganic powder component and a binder resin in an organic solvent, onto the nonmagnetic support 1.

The magnetic tape 10 according to the above-described embodiment is suitably used for the linear type magnetic recording tape system in which recording and reproduction are performed while the magnetic tape is bidirectionally running with the MR head.

Herein, the MR head is a reproduction-only magnetic head for detecting a signal from the magnetic tape using magnetoresistance effects. Since the MR head generally has a higher sensitivity and a larger reproduction output than those of an inductive magnetic head using electromagnetic induction to perform recording and reproduction, the MR head is suitable for a magnetic recording medium for high-density recording.

The MR head includes, for example, a pair of magnetic shields made of a soft magnetic material such as Ni—Zn polycrystalline ferrite, and an approximately rectangular MR element interposed between the pair of magnetic shield through an insulator. A pair of terminals are led from both ends of the MR element. A sense current can be supplied to the MR element through the pair of terminals.

When a signal is to be reproduced from the magnetic recording medium by using the MR head, the MR element is made to slide on the magnetic tape. Then, in this state, the sense current is supplied to the MR element through the terminals connected to both ends of the MR element, so that a change in voltage of the sense current is detected.

When the sense current is supplied to the MR element while the MR element is sliding on the magnetic tape, a magnetizing direction of the MR element changes in accordance with a magnetic field from the magnetic tape to change a relative angle between the sense current supplied to the MR element and the magnetizing direction. Then, depending on the relative angle formed by the magnetizing direction of the MR element and the sense current, a resistance value changes.

As a result of keeping a value of the sense current supplied to the MR element constant, a change in voltage occurs in the sense current. Therefore, by detecting the change in voltage of the sense current, a signal magnetic field from the magnetic tape is detected to reproduce a signal recorded to the magnetic tape. As a magnetic head for reproduction, a so-called giant magnetoresistive head (GMR head) can also be used.

As a method for applying a bias magnetic field to the MR element, besides an SAL bias method, for example, various other methods such as a permanent magnet bias method, a shunt current bias method, a self-bias method, an exchange bias method, a barber pole method, a divided-element method and a servo bias method can be used. The GMR element and various bias methods are described in detail, for example, in "Magneto-Resistive Heads: Fundamentals and Applications" by John C. Mallinson, translated in Japanese by Kazuhiko Hayashi, Japanese edition issued by Maruzen Company Ltd.

EXAMPLES

Hereinafter, the specific examples of the present invention will be described. However, the present invention is not limited to the following examples.

As shown in FIG. 1, the magnetic tape 10 in the examples of the present invention includes the base film corresponding to the nonmagnetic support 1, the magnetic layer 2 composed of thin films made of a ferromagnetic metal or an alloy thereof formed on the nonmagnetic support 1, the protective film 3 and the lubricant layer 4 formed on the magnetic layer 2, and the backcoating layer 5 formed on the surface of the nonmagnetic support 1 opposite to the surface where the magnetic layer 2 is formed. In particular, the magnetic layer 2 has a double-layered structure so as to be suitable for use in the linear system.

For the thus obtained magnetic tape, a heat-shrinkage ratio is measured by the following method. The heat-shrinkage ratio is measured according to JIS-C2318. A sample size in this case is 10 mm in width and 200 mm in gauge interval. The measurement conditions are a temperature at 100° C., treatment time of 30 minutes, and no load applied. The heat-shrinkage ratio of the tape at 100° C. is obtained by the following Formula (1).

Formula 1

$$\text{Heat-shrinkage ratio (\%)} = \{(L0-L)/L0\} \times 100 \qquad (1)$$

In the above Formula, L0 is a gauge interval before the heat treatment, and L is a gauge interval after the heat treatment.

The humidity expansion coefficient of the magnetic tape is measured by the following method. After a magnetic tape having a length of 100 mm is left in an environment at 25° C. and 10% RH (relative humidity) for four hours, the length of the magnetic tape is measured. Thereafter, after the magnetic tape is left in a dry environment at 50° C. (relative humidity of 10% or lower) for 10 minutes in order to prevent condensation, the magnetic tape is further left in an environment at 25° C. and 80% RH for four hours. Then, the length of the magnetic tape is measured. A humidity expansion coefficient is calculated by using the following Formula (2) from the measured values of the thus obtained magnetic tape at the respective humidities.

Formula 2

$$\text{Humidity expansion coefficient} = (A-B)/(80-10) \times A \quad (2)$$

Wherein A is a length of the magnetic tape at 25° C. and 80% RH, and B is a length of the magnetic tape 25° C. and 10% RH.

Hereinafter, an example of the present invention will be more specifically described in comparison with comparative examples.

Example 1

First, Co was deposited by an oblique evaporation method using a vacuum evaporation apparatus onto a polyethylene terephthalate film having a thickness of 8.0 µm, on which projections, each having a height of 15 nm, were provided at 50 million/mm$^2$, serving as the nonmagnetic support (base) 1 while a small amount of oxygen was being introduced. The ferromagnetic metal thin film was deposited to 30 nm so as to obtain the lower-layer magnetic thin film 2a. An orientation angle at this time was about 60°. Furthermore, another ferromagnetic metal thin film was deposited in a similar manner to 20 nm so as to obtain the upper-layer magnetic thin film 2b while the tape was made to run in the opposite direction so that a column of the magnetic layer was grown in the direction opposite to that of the first deposition. An orientation angle of the magnetic film obtained by the second deposition was 60°. However, a direction of an in-plane component of a vector is opposite, that is, at 180 degrees to that of the lower magnetic thin film 2a. As a result, the magnetic layer 2 composed of the lower-layer magnetic thin film 2a and the upper-layer magnetic thin film 2b having a total thickness of 50 nm was formed.

Next, a current voltage of −1.5 V was applied to the magnetic recording medium across an electrode and the magnetic recording medium itself as a counter electrode by a high-frequency plasma of a mixture gas of ethylene and argon so as to generate discharge, thereby forming the protective film 3 made of a carbon protective film having a thickness of about 10 nm on the magnetic layer 2. Next, the backcoating layer 5 made of carbon and a polyurethane resin having a thickness of 0.5 µm was formed on the surface of the nonmagnetic support 1 made of a polyethylene terephthalate film, opposite to the surface where the magnetic layer 2 is formed. Furthermore, a lubricant obtained by dissolving perfluoro polyether in a hexane solution was applied onto the surface of the protective film 3 so that the amount of application was 5 mg/m$^2$, thereby forming the lubricant layer 4.

As the last step, the thus obtained tape was cut to have a width of ½ inch (1.27 cm), thereby fabricating a sample tape. The heat-shrinkage ratio of the magnetic tape was measured to be 0.2%, and the humidity expansion coefficient was $0.4 \times 10^{-6}$/% RH.

Example 2

The magnetic tape was fabricated in the same manner as in Example 1 except that the thickness of the lower-layer magnetic thin film 2a was 15 nm and the thickness of the upper-layer magnetic thin film 2b was 10 nm, that is, the total thickness of the magnetic layer 2 was 25 nm. The heat-shrinkage ratio of the magnetic tape was 0.25%, and the humidity expansion coefficient was $0.5 \times 10^{-6}$/% RH.

Example 3

The magnetic tape was fabricated in the same manner as in Example 1 except that the thickness of the lower-layer magnetic thin film 2a was 50 nm and the thickness of the upper-layer magnetic thin film 2b was 25 nm, that is, the total thickness of the magnetic layer 2 was 75 nm. The heat-shrinkage ratio of the magnetic tape was 0.1%, and the humidity expansion coefficient was $0.3 \times 10^{6}$/% RH.

Example 4

The magnetic tape was fabricated in the same manner as in Example 1 except that the thickness of the nonmagnetic support 1 was 6 µm. The heat-shrinkage ratio of the magnetic tape was 0.2%, and the humidity expansion coefficient was $0.4 \times 10^{-6}$/% RH.

Example 5

The magnetic tape was fabricated in the same manner as in Example 1 except that polyethylene naphthalate (PEN) was used as the material of the nonmagnetic support 1. The heat-shrinkage ratio of the magnetic tape was 0.1%, and the humidity expansion coefficient was $0.4 \times 10^{-6}$/% RH.

Example 6

The magnetic tape was fabricated in the same manner as in Example 1 except that the material of the nonmagnetic support 1 was ARAMID. The heat-shrinkage ratio of the magnetic tape was 0%, and the humidity expansion coefficient was $0.3 \times 10^{-6}$/% RH.

Example 7

The magnetic tape was fabricated in the same manner as in Example 1 except that the thickness of the lower-layer magnetic thin film 2a was 5 nm and the thickness of the upper-layer magnetic thin film 2b was 5 nm, that is, the total thickness of the magnetic layer 2 was 10 nm. The heat-shrinkage ratio of the magnetic tape was 0.5%, and the humidity expansion coefficient was $1 \times 10^{-6}$/% RH.

Example 8

The magnetic tape was fabricated in the same manner as in Example 1 except that the thickness of the lower-layer magnetic thin film 2a was 10 nm and the thickness of the upper-layer magnetic thin film 2b was 5 nm, that is, the total thickness of the magnetic layer 2 was 15 nm. The heat-shrinkage ratio of the magnetic tape was 0.35%, and the humidity expansion coefficient was $0.7 \times 10^{-6}$/% RH.

Example 9

The magnetic tape was fabricated in the same manner as in Example 1 except that the thickness of the nonmagnetic support 1 was 4 µm. The heat-shrinkage ratio of the magnetic tape was 0.1%, and the humidity expansion coefficient was $0.3 \times 10^{-6}$/% RH.

Example 10

The magnetic tape was fabricated in the same manner as in Example 1 except that the thickness of the nonmagnetic support 1 was 9 μm. The heat-shrinkage ratio of the magnetic tape was 0.2%, and the humidity expansion coefficient was $0.4\times10^{-6}$/% RH.

Comparative Example 1

The magnetic tape was fabricated in the same manner as in Example 1 except that the protective film 3 made of a carbon protective film was omitted. The heat-shrinkage ratio of the magnetic tape was 0.7%, and the humidity expansion coefficient was $5.0\times10^{-6}$/% RH.

Comparative Example 2

The magnetic tape was fabricated in the same manner as in Example 1 except that the thickness of the lower-layer magnetic thin film 2a was 5 nm and the thickness of the upper-layer magnetic thin film 2b was 2.5 nm, that is, the total thickness of the magnetic layer 2 was 7.5 nm. The heat-shrinkage ratio of the magnetic tape was 0.7%, and the humidity expansion coefficient was $4.0\times10^{-6}$/% RH.

Comparative Example 3

The magnetic tape was fabricated in the. same manner as in Example 1 except that the thickness of the lower-layer magnetic thin film 2a was 100 nm and the thickness of the upper-layer magnetic thin film 2b was 50 nm, that is, the total thickness of the magnetic layer 2 was 150 nm. The heat-shrinkage ratio of the magnetic tape was 0.2%, and the humidity expansion coefficient was $0.3\times10^{-6}$/% RH.

Comparative Example 4

The magnetic tape was fabricated in the same manner as in Example 1 except that the thickness of the nonmagnetic support 1 was 3 μm. The heat-shrinkage ratio of the magnetic tape was 0.2%, and the humidity expansion coefficient was $0.4\times10^{-6}$/% RH.

Comparative Example 5

The magnetic tape was fabricated in the same manner as in Example 1 except that the thickness of the nonmagnetic support 1 was 15 μm. The heat-shrinkage ratio of the magnetic tape was 0.7%, and the humidity expansion coefficient was $3\times10^{-6}$/% RH.

Comparative Example 6

The magnetic tape was fabricated in the same manner as in Example 1 except that the magnetic layer 2 was formed as a single layer having a thickness of 50 nm. The heat-shrinkage ratio of the magnetic tape was 0.2%, and the humidity expansion coefficient was $0.4\times10^{-6}$/% RH.

Comparative Example 7

The magnetic tape was fabricated in the same manner as in Example 1 except that the thickness of the nonmagnetic support 1 was 10 μm, the thickness of the lower-layer magnetic thin film 2a was 5 nm and the thickness of the upper-layer magnetic thin film 2b was 5 nm, that is, the total thickness of the magnetic layer 2 was 10 nm. The heat-shrinkage ratio of the magnetic tape was 0.6%, and the humidity expansion coefficient was $2\times10^{-6}$/% RH.

Comparative Example 8

The magnetic tape was fabricated in the same manner as in Example 1 except that the thickness of the lower-layer magnetic thin film 2a was 6 nm and the thickness of the upper-layer magnetic thin film 2b was 2.5 nm, that is, the total thickness of the magnetic layer 2 was 8.5 nm. The heat-shrinkage ratio of the magnetic tape was 0.6%, and the humidity expansion coefficient was $3.0\times10^{-6}$/% RH.

Comparative Example 9

The magnetic tape was fabricated in the same manner as in Example 1 except that the thickness of the nonmagnetic support 1 was 2 μm. The heat-shrinkage ratio of the magnetic tape was 0.1%, and the humidity expansion coefficient was $0.2\times10^{-6}$/% RH.

Comparative Example 10

The magnetic tape was fabricated in the same manner as in Example 1 except that the thickness of the nonmagnetic support 1 was 12 μm. The heat-shrinkage ratio of the magnetic tape was 0.6%, and the humidity expansion coefficient was $2.5\times10^{-6}$/% RH.

The Results of Evaluation

The evaluation test for stock stability was conducted for the thus fabricated magnetic tapes. First, a recording head (Metal In Gap head; a gap of 0.16 μm and 1.8T) and an MR head for reproduction (optimal Br·t: 0.0035 T·μm) were attached to a remodeled DLT7000 drive.

These heads were fixed heads. Signals were recorded onto the magnetic tapes at a track width of 10 μm and a linear recording density of 100 kFCl by using the above-mentioned drive. After stock in an atmosphere at 40° C. and 80% RH for 100 hours, the data was reproduced. Based on the reproduction conditions of the data, the stock stability of each of the magnetic tapes was evaluated.

Figure 3:
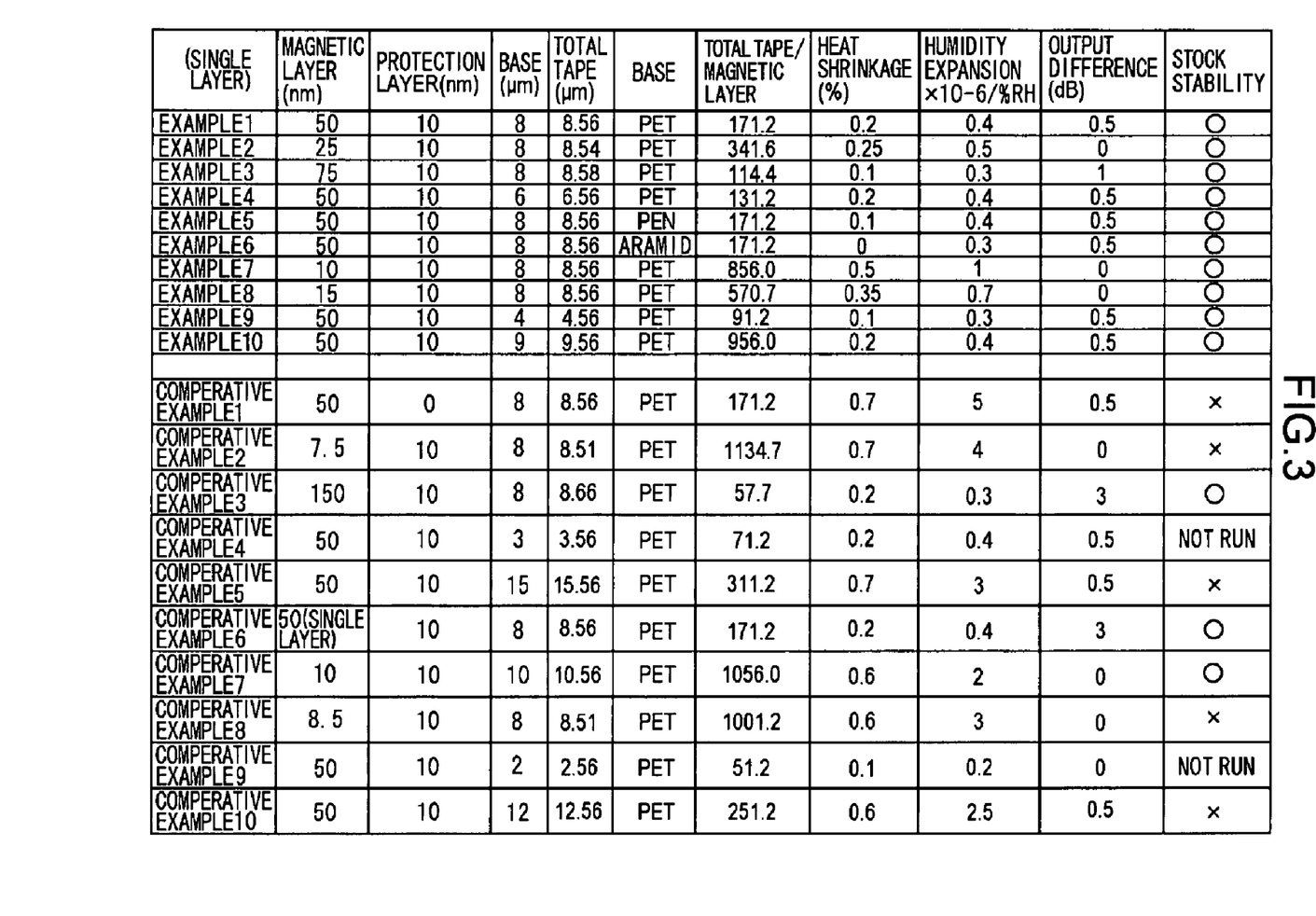
FIG. 3 is a table showing the results of evaluation for the magnetic tapes according to the embodiment of the present invention.

In the case where no track offset occurred in the magnetic tape to normally reproduce the data, the tape was evaluated with a circle mark. In the case where a part of the data could not be read out, the tape was evaluated with a cross mark. A difference in output in accordance with the running direction of the tape was evaluated in the above test drive. Herein, a difference between forward and reverse directions of 1 dB or less was allowable. The results of these evaluations are shown in FIG. 3.

For Examples 1 to 10, even if the thickness of the magnetic layer, the material and the thickness of the nonmagnetic support and the like are varied, the heat-shrinkage ratio and the humidity expansion coefficient fall within the range of the present invention, that is, the heat-shrinkage ratio is 0.50% or less and the humidity expansion coefficient is $1\times10^{-6}$/% RH or less. Therefore, the recording tape stock stability is evaluated as good. Moreover, an output difference between forward direction and reverse direction is as small as 1 dB or less.

Since the magnetic tape in Comparative Example 1 does not have the protective film 3, it has large heat-shrinkage ratio and humidity expansion coefficient, resulting in poor recording tape stock characteristics. From this result, it is found that not only the reinforcement by the magnetic layer 2 but also the presence of the protective film 3 are required to keep the heat-shrinkage ratio and the humidity expansion coefficient within the above range to improve the recording tape stock stability.

Since the magnetic layer 2 is too thin in the magnetic tape in Comparative Example 2, the magnetic tape has large heat-shrinkage ratio and humidity expansion coefficient, resulting in poor recording tape stock characteristics. Moreover, although a difference between forward and reverse outputs is small, a sufficient output is not obtained because of too small thickness of the magnetic layer 2. In Example 7, the heat-shrinkage ratio and the humidity expansion coefficient are kept within the above-described range in the case where the thickness of the magnetic layer 2 is 10 nm. From this result, it is found that the thickness of the magnetic layer 2 is required to be 10 nm or more.

Since the magnetic layer 2 is too thick in Comparative Example 3, an output difference between forward and reverse directions is large. On the other hand, in Example 3, a difference between forward and reverse outputs is kept to be 1 dB or less in the case where the thickness of the magnetic layer 2 is 75 nm. From this result, it is found that the thickness of the magnetic layer 2 is required to be 75 nm or less.

Since the nonmagnetic support 1 is too thin in Comparative Example 4, the stable running of the tape is not achieved. On the other hand, in Example 9, the stable running of the tape is ensured in the case where the thickness of the nonmagnetic support 1 is 4 μm. From this result, it is found that the thickness of the nonmagnetic support 1 is required to be 4 μm or more.

Since the nonmagnetic support 1 is too thick in Comparative Example 5, the reinforcement by the magnetic layer 2 and the protective film 3 is not sufficient, resulting in large heat-shrinkage ratio and humidity expansion coefficient. Accordingly, recording tape stock characteristics are poor.

Since the magnetic layer 2 is a single layer in Comparative Example 6, a difference between forward and reverse outputs is large. From this fact, it is found that the magnetic layer is required to have at least a double-layered structure to keep an output difference between forward and reverse outputs at 1 dB or less.

Although Comparative Example 7 satisfies the ranges of the present invention recited in claims in terms of the thickness of the magnetic layer and the total thickness of the tape, its ratio of the total thickness to the thickness of the magnetic layer exceeds 1000. Accordingly, the heat-shrinkage ratio and the humidity expansion coefficient are large, resulting in poor recording tape stock characteristics.

Since the magnetic layer 2 is too thin in Comparative Example 8, the heat-shrinkage ratio and the humidity expansion coefficient are large, resulting in poor recording tape stock characteristics. Moreover, although an output difference between forward direction and reverse direction is small, a sufficient output is not obtained because of too small thickness of the magnetic layer 2. In Example 7, the heat-shrinkage ratio and the humidity expansion coefficient are kept within the above-described range in the case where the thickness of the magnetic layer 2 is 10 nm. From this result, it is found that the thickness of the magnetic layer 2 is required to be 10 nm or more.

Since the nonmagnetic support 1 is too thin in Comparative Example 9, the stable running of the tape is not achieved. On the other hand, in Example 9, the stable running of the tape is ensured in the case where the thickness of the nonmagnetic support 1 is 4 μm. From this result, it is found that the thickness of the nonmagnetic support 1 is required to be 4 μm or more.

Since the nonmagnetic support 1 is too thick in Comparative Example 10, the reinforcement by the grown layer is not sufficient, resulting in large heat-shrinkage ratio and humidity expansion coefficient. Accordingly, recording tape stock characteristics are poor. On the other hand, in Example 10, the heat-shrinkage ratio and the humidity expansion coefficient are kept within the above-described range in the case where the thickness of the nonmagnetic support 1 is 9 μm. From this result, it is found that the thickness of the nonmagnetic support 1 is required to be 10 μm or less.

As described in the above Examples, as the magnetic tape for computer data recording or the like, the heat-shrinkage ratio and the humidity expansion coefficient of the tape are defined to be the above-described predetermined values or less. As a result, the degree of deformation of the tape is kept small even after stock or even in use under the environment where a humidity greatly fluctuates. Therefore, a decrease in reproduction output is also small.

In order to keep the heat-shrinkage ratio and the humidity expansion coefficient of the tape at the above-described predetermined values or less, it is necessary to define the total thickness of the magnetic layer to be 4.0 μm to 10.0 μm. Similarly, it is necessary to define the total thickness of the magnetic layer to be 10 nm to 75 nm. Furthermore, it is necessary to define a ratio of the total thickness of the magnetic tape to the thickness of the magnetic layer to be 1000 or less. In particular, at least in the case where a width of the magnetic tape is ½ inch (1.27 cm), it is ensured that the degree of deformation in tape form (dimensions) is not large enough to decrease a reproduction output if the heat-shrinkage ratio and the humidity expansion coefficient are within the above ranges. Furthermore, the thickness of the nonmagnetic support 1, the thickness of the magnetic layer 2, and a relative ratio of the thicknesses are preferably required to satisfy all the above conditions.

As a result, for example, even in the case where the magnetic tape of the present invention is installed and operated in a magnetic recording/reproduction system capable of recording and reproduction data to/from a track pitch smaller than a conventional one, off-track or the like scarcely occurs because the degree of deformation of the magnetic tape is small. Furthermore, since such a system can be used with the tape, recording at a higher density can be realized. Moreover, since a difference in output between a forward direction and a reverse direction is small, data can be recorded at a high density even in a linear tape system which bidirectionally records and reproduces data.

The present invention is not limited to the description of the above embodiments. For example, the structure of the magnetic tape is not limited to the above-described one. Any changes and modifications are possible without departing from the scope of the present invention. For example, a layer such as a base coating layer, a lubricant layer or an anti-corrosive layer may be formed on the nonmagnetic support as needed. Besides such changes, various changes and modifications are possible without departing from the scope of the present invention.

What is claimed is:

1. A magnetic tape comprising:
   a longitudinally extending nonmagnetic support having a longitudinal direction and a width direction;
   a magnetic layer formed by depositing a plurality of evaporated metal magnetic films on the longitudinally extending nonmagnetic support, each having an oblique column-like structure, on a principal surface of said nonmagnetic support so that a growth direction of each of said deposited evaporated metal magnetic films is opposite to said growth direction of the previously deposited evaporated metal magnetic film, said magnetic layer having a double-layered structure composed of a lower metal magnetic thin film and an upper metal magnetic thin film;

a protective layer formed on said magnetic layer; and a backcoating layer formed on the other surface of said longitudinally extending nonmagnetic support, wherein, a heat-shrinkage ratio in said longitudinal direction and a width direction is 0.50% or less, a humidity expansion coefficient is $1 \times 10^{-6}$/% RH or less after stock at 100° C. and 5% RH for 30 minutes, a total thickness of said longitudinally extending nonmagnetic support is from 4.0 µm to 10.0 µm so that said heat-shrinkage ratio and said humidity expansion coefficient satisfy said conditions, a total thickness of said magnetic layer is from 10 nm to less than 50 nm so that said heat-shrinkage ratio and said humidity expansion coefficient satisfy said conditions, and a ratio of a total thickness of said magnetic tape to the total thickness of said magnetic layer of 1000 or less so that said heat-shrinkage ratio and said humidity expansion coefficient satisfy said conditions.

2. The magnetic tape according to claim 1, wherein:

a width of said magnetic tape is defined to be 1.27 cm.

3. The magnetic tape according to claim 1, wherein:

the thickness of said magnetic layer from 10 nm to 25 nm.

* * * * *